United States Patent [19]

Dilich et al.

[11] Patent Number: 5,628,033

[45] Date of Patent: May 6, 1997

[54] ACCIDENT INVESTIGATION AND RECONSTRUCTION MAPPING WITH AERIAL PHOTOGRAPHY

[75] Inventors: Michael A. Dilich, Evanston; John M. Goebelbecker, Chicago, both of Ill.

[73] Assignee: Triodyne, Inc., Niles, Ill.

[21] Appl. No.: 536,502

[22] Filed: Sep. 28, 1995

[51] Int. Cl.$^6$ .............................. G03B 39/00; H04N 7/18; H04N 9/47
[52] U.S. Cl. .................... 396/7; 348/136; 348/144
[58] Field of Search .................. 354/65, 72; 348/143, 348/144, 145, 148, 149, 135, 136, 137, 146, 147

[56] References Cited

U.S. PATENT DOCUMENTS

| | | |
|---|---|---|
| 85,247 | 12/1868 | Scott . |
| 359,902 | 3/1887 | Steffens . |
| 4,596,037 | 6/1986 | Bouchard et al. ............... 382/8 |
| 4,809,066 | 2/1989 | Leberl et al. ................. 358/107 |
| 4,977,451 | 12/1990 | Besnard ...................... 358/108 |
| 5,166,789 | 11/1992 | Myrick ....................... 358/109 |
| 5,296,852 | 3/1994 | Rathi ......................... 340/933 |
| 5,331,419 | 7/1994 | Yamada et al. ................. 348/64 |
| 5,414,462 | 5/1995 | Veatch ........................ 348/135 |

*Primary Examiner*—Safet Metjahic
*Assistant Examiner*—John Chizmar
*Attorney, Agent, or Firm*—Lee, Mann, Smith, McWilliams, Sweeney & Ohlson

[57] ABSTRACT

A method and apparatus for creating a pictorial illustration of a site to be mapped, such as for reconstruction of a vehicle accident site. In accordance with the method, the site is marked with visible indicia of scale, a camera is then suspended over the site and a vertically overhead photographic image of the site is taken, the photographic image is then processed and scaled utilizing the visible indicia marked on the site, and a pictorial illustration is creating by applying symbols to the photographic image. The camera is suspended over the site beneath a blimp. The photographic image can be digitized if desired. The apparatus according to the invention includes the blimp, an appropriate suspension apparatus for the camera beneath the blimp, a receiver system including a shutter control for the camera, and a remote transmitter for sending control signals to the receiver system in order to control taking of photographs by the camera.

10 Claims, 6 Drawing Sheets

ACCIDENT INVESTIGATION AND RECONSTRUCTION MAPPING WITH AERIAL PHOTOGRAPHY

BACKGROUND OF THE INVENTION

This invention relates to a method of vehicle accident investigation, mapping and reconstruction using a close-range aerial photography method apparatus in conjunction with sophisticated imaging and computer graphics technology.

Reconstructionists typically employ conventional survey techniques to measure the position of points which define the roadway and any physical evidence. They use these points to construct a scaled, plan view drawing of the accident site. The more data points collected, the more complete and praise the drawing. Instead of tape measures and surveyors' transits, many reconstructionists use sophisticated electronic survey systems which can record several hundred points within a practical time frame. However, even if 1,000 points were collected, the line drawing generated would still fall short of the detailed information stored in a single close-range aerial photograph.

Color aerial photos clearly display roadway geometry and off-road landmarks to which witnesses may refer as well as reveal evidence detectable only from an overhead perspective. Unfortunately, aircraft aerial photography services are not normally considered to be acceptable alternatives to conventional survey techniques because of high expense, coordination difficulties, low-altitude limitations and difficulty in obtaining direct overhead views.

This invention has been developed as a practical tool for obtaining close-range vertically correct aerial photographs during the inspection of an accident site without the use of aircraft. A camera is suspended in a damped gimbal mount over the accident site from a tethered, ultra light, helium-filled blimp at altitudes of 100 to 1,500 feet. The camera's operation is radio-controlled by a person on the ground to ensure optimum lighting, camera position and traffic flow.

The high resolution aerial photographs are then digitized for use with computer imaging technology which allows accurate placement of accident vehicles, tiremarks and other evidence directly in the image. The invention's close-range aerial photographs record surface details such as cracks, patches, joints and other irregularities in the pavement which may also appear in police scene photographs and which can be used as common reference points for constructing an accident scene map. The full-color, scalable, photographic map generated by the invention provides an effective tool for mapping a complex accident site, reconstructing the scene, analyzing the accident and presenting findings to others.

SUMMARY OF THE INVENTION

The invention is directed to a method and apparatus for creating a photographic map of an accident site and graphical reconstruction of an accident scene. The method comprises the following steps: 1. temporarily marking the accident site with visible indicia of scale; 2. suspending a camera over the site; 3. creating a vertically overhead photographic image of the site; 4. processing the photo using conventional means; 5. digitizing the photographic image using appropriate means such as PhotoCD technology; 6. enhancing the image for desired sharpness, color balance, orientation, etc. using imaging software; 7. highlighting important features in the image using computer graphics; 8. positioning computer-generated graphic art, such as vehicles and other symbols, in the image to reconstruct the accident scene.

In accordance with the preferred form of the invention, suspension of the camera includes mounting the camera beneath a lighter-than-air blimp in a manner which allows the film plane to continually maintain a level orientation with respect to the earth and then elevating the blimp to a desired altitude over the site. Optimally, the camera orientation relative to the blimp is adjusted so that the long dimension of the film format is in a desired alignment with respect to the site after the blimp is launched and under the influence of local wind conditions.

The method of the invention is particularly amenable to reconstruction of a vehicular accident scene. The step of placing computer-generated graphic art in the image includes constructing templates of motor vehicles which demonstrate significant attributes (e.g. color, length, width, wheelbase, view position of driver, etc.), positioning said templates in image at several relevant positions, drawing tire marks, gouges and fluid stains on roadway, and providing explanatory textual notes and traffic control symbols. The artwork placed in image is based on analysis of physical and testimonial evidence and traditional accident reconstruction techniques.

The apparatus according to the invention comprises a lighter-than-air blimp, a yoke secured beneath the blimp and a camera for taking vertically overhead photographic images of the site mounted on a pivoted rod located beneath the yoke. In one form of the invention, an air piston damper extends between the rod and the yoke to dampen swinging of the camera and the rod. In another form, a disk mounted to the swinging rod dampens the oscillations by sliding over the surface of the yoke as the rod moves. The camera is supported directly above its center of gravity which enables gravitational forces to continuously restore the camera to its proper position. Mounted on the yoke, a receiver system is connected to the camera and controls the shutter. A remote transmitter sends control signals to the receiver control which activates the camera shutter. Means is also provided for manually rotating the camera such that the photographic image is in a desired alignment with the site.

BRIEF DESCRIPTION OF THE DRAWINGS

The invention is described in greater detail in the following description of examples embodying the best mode of the invention, taken in connection with the drawing figures, in which.

DESCRIPTION OF AN EXAMPLE EMBODYING THE BEST MODE OF THE INVENTION

Figure 1:
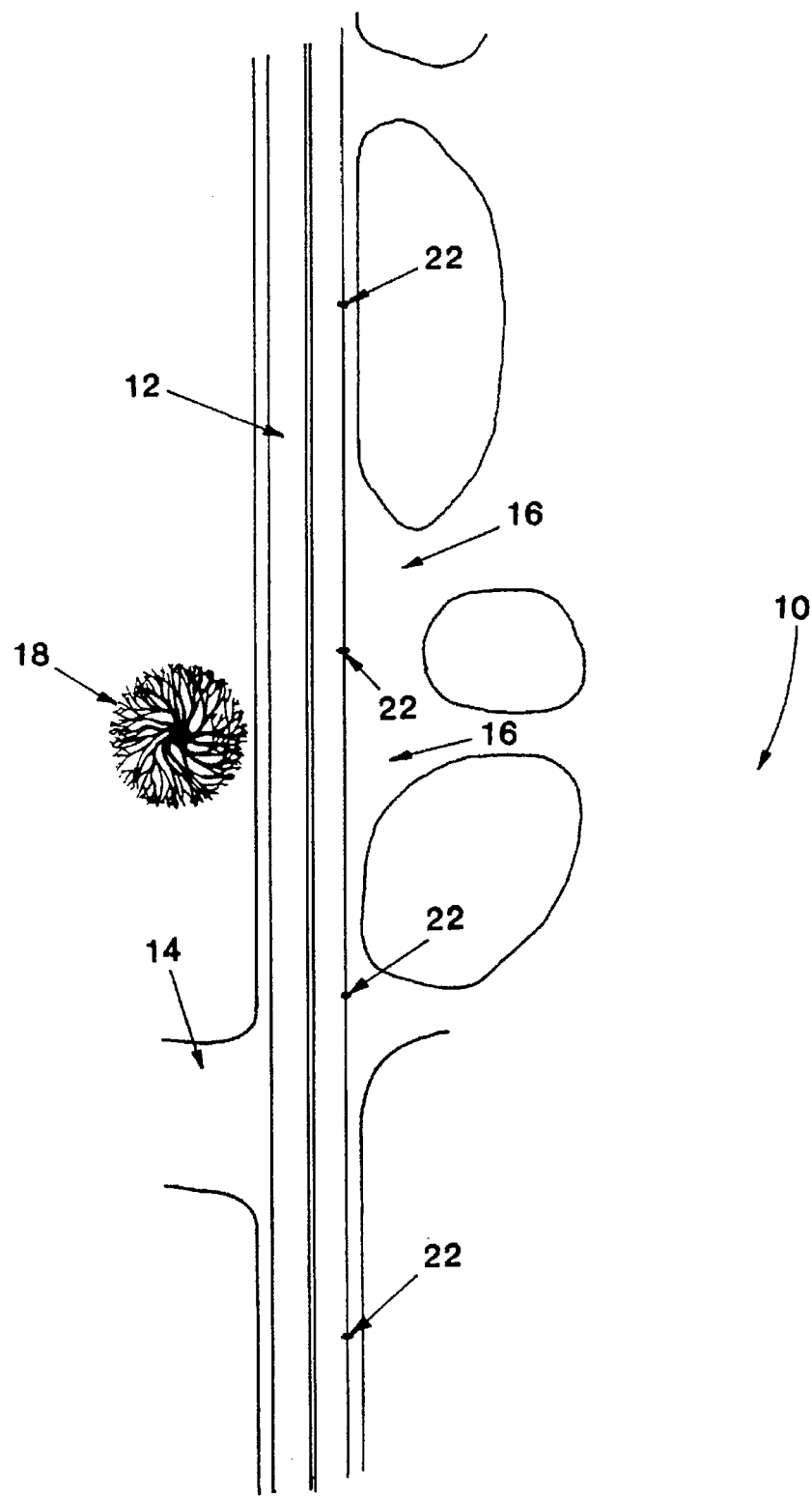
FIG. 1 is a representation of an aerial photograph of an accident site, with visible indicia of scale being applied to a roadway.

The invention is described in connection with creating a pictorial illustration of an accident site, and an accident site is shown generally at 10 in FIGS. 1 through 3. The illustrated accident site includes a major roadway 12, a side road 14, and various entry points 16 to the major roadway 12. A tree 18 and fence 20 are also depicted.

In FIG. 1, the accident site has been temporarily marked with a series of marks 22 which are indicia of scale of the site 10, such as 100 foot spacings. The marks 22 are sufficiently bold to be seen in the elevation illustrated.

Figure 3:
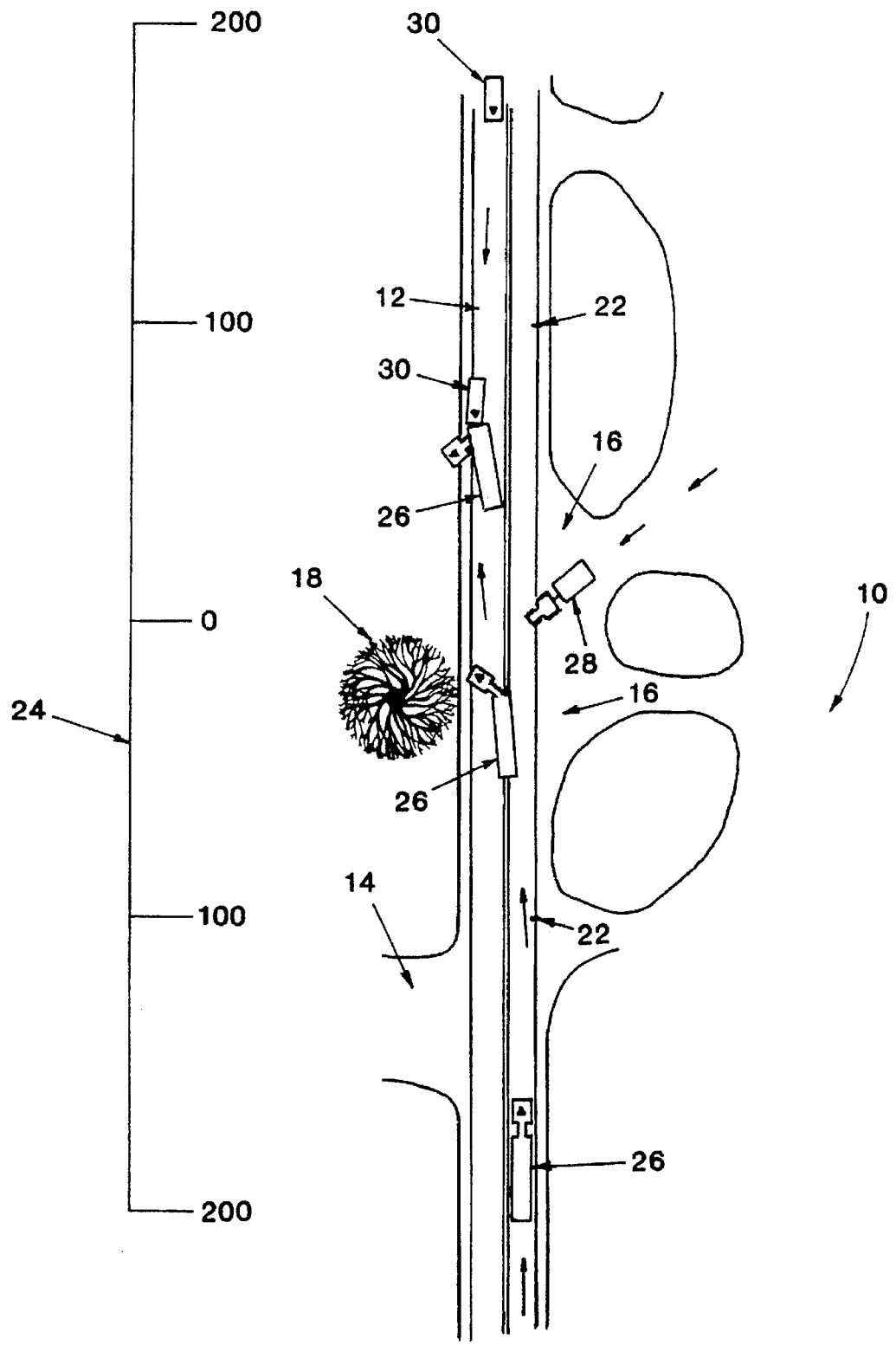
FIG. 3 is a view, similar to FIG. 1, but after the pictorial illustration has been created by applying a scale and representations of vehicles involved in the accident to the photographic image.

FIG. 3 is similar to FIG. 1, but after an accident has been reconstructed on the photographic image of the accident site 10. Illustrated is a scale 24 applied to the photographic image, which has been depicted in 100 foot increments to correspond to the marks 22 applied to the roadway 12. Also illustrated are three vehicles 26, 28 and 30 at various points in time, depicting recreation of an accident where the vehicles 26 and 30 are shown impacting one another.

Figure 2:
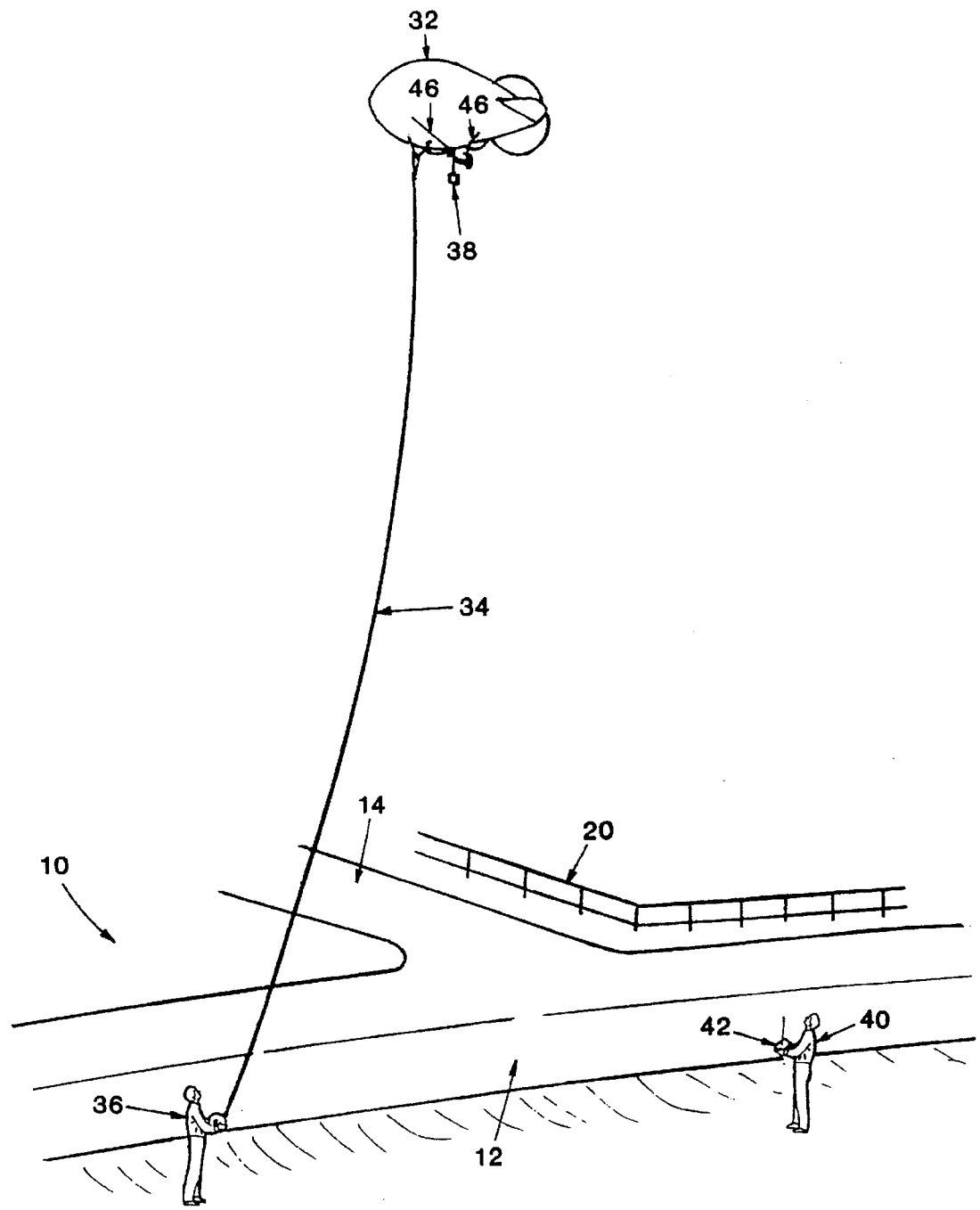
FIG. 2 is a perspective view of the utilization of the blimp and camera according to the invention, when elevated over the accident site depicted in FIG. 1.
Figure 4:
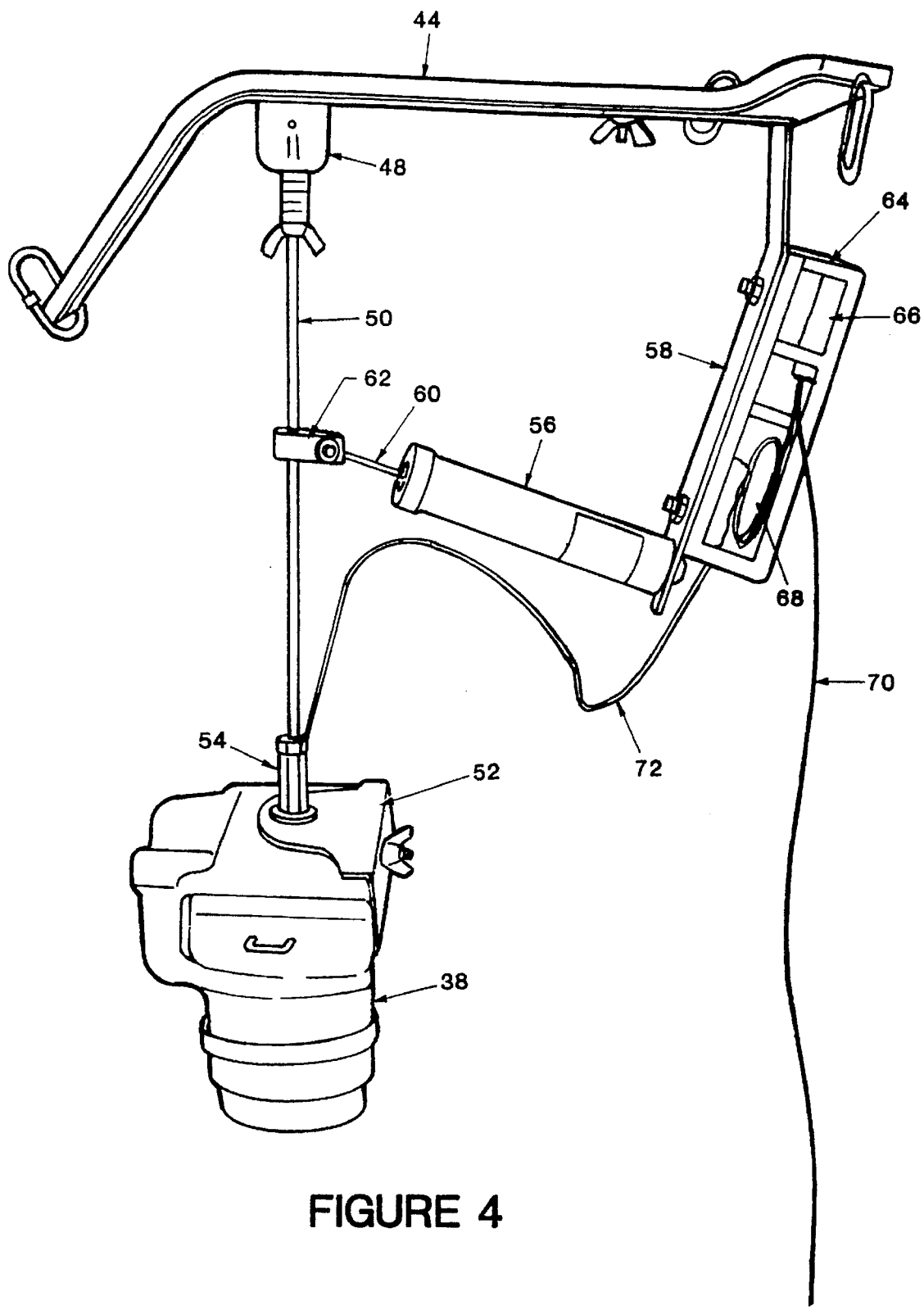
FIG. 4 is an enlarged perspective view of the apparatus according to the invention which is secured to the blimp shown in FIG. 2.
Figure 5:
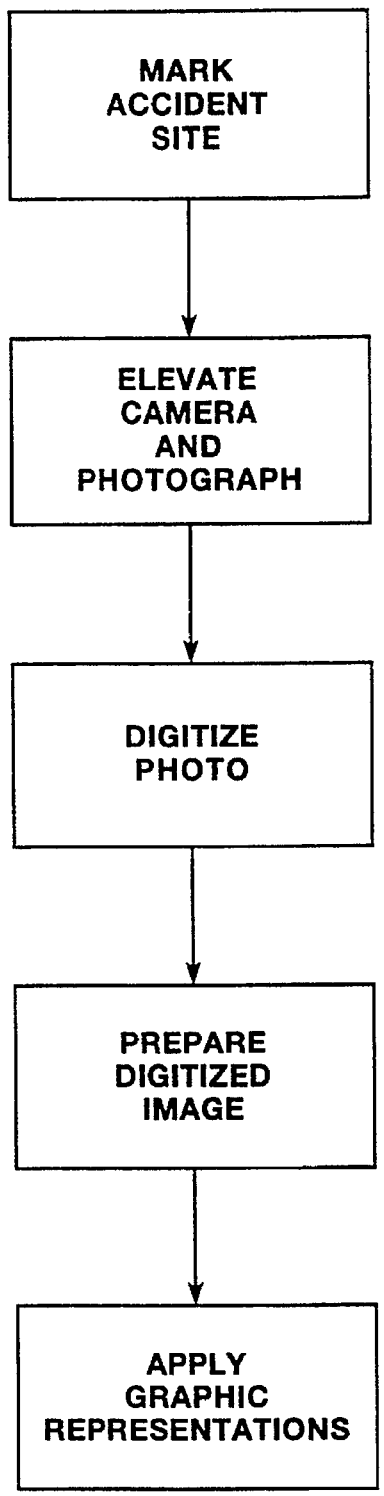
FIG. 5 is a block diagram of various aspects of the method according to the invention.

FIG. 2 illustrates positioning of a camera to take the photographic image shown in FIG. 1 so that the photographic image can be embellished as shown in FIG. 3. In FIG. 2, a lighter-than-air blimp 32 is illustrated, suspended on a tether 34, controlled by an individual 36, above the roadway 12. A camera and mounting hardware 38, best illustrated in FIG. 4, are mounted beneath the blimp 32 so that the photographic image shown in FIG. 1 can be taken. A second individual 40 is illustrated, handling a transmitter 42 for controlling the shutter of the camera 38, as described below. Optionally, the camera 38 can be mounted for rotation beneath the blimp 32 and can be controlled remotely by the second individual 40.

The apparatus shown in FIG. 4 includes a yoke 44 which is appropriately secured to the blimp 42, such as by a series of lines 46 (FIG. 2). A bracket 48 is secured to the yoke 44, and a rod 50 is pivotally mounted in the bracket 48. The camera 38 is mounted at its center of gravity in a bracket assembly 52 which is secured to the rod 50 via a connector 54.

The rod 50 is free to pivot in the bracket 48. To dampen that pivoting, an air piston damper 56 is secured at one end to an arm 58 extending from the yoke 44. The piston 60 of the damper 56 is secured at 62 to the rod 50. Thus, the air piston damper, which functions in a conventional fashion, dampens any swinging of the camera 38 as it is suspended beneath the blimp 32.

The apparatus also includes a receiver system 64 secured to the arm 58. The receiver system 64 includes a radio-controlled receiver 66 and a control motor 68. An antenna 70 receives signals from the transmitter 42 (FIG. 2). A wire 72 leads from the control motor 68 to the camera 38 for control of the shutter of the camera 38 when photographs are to be taken.

Figure 6:
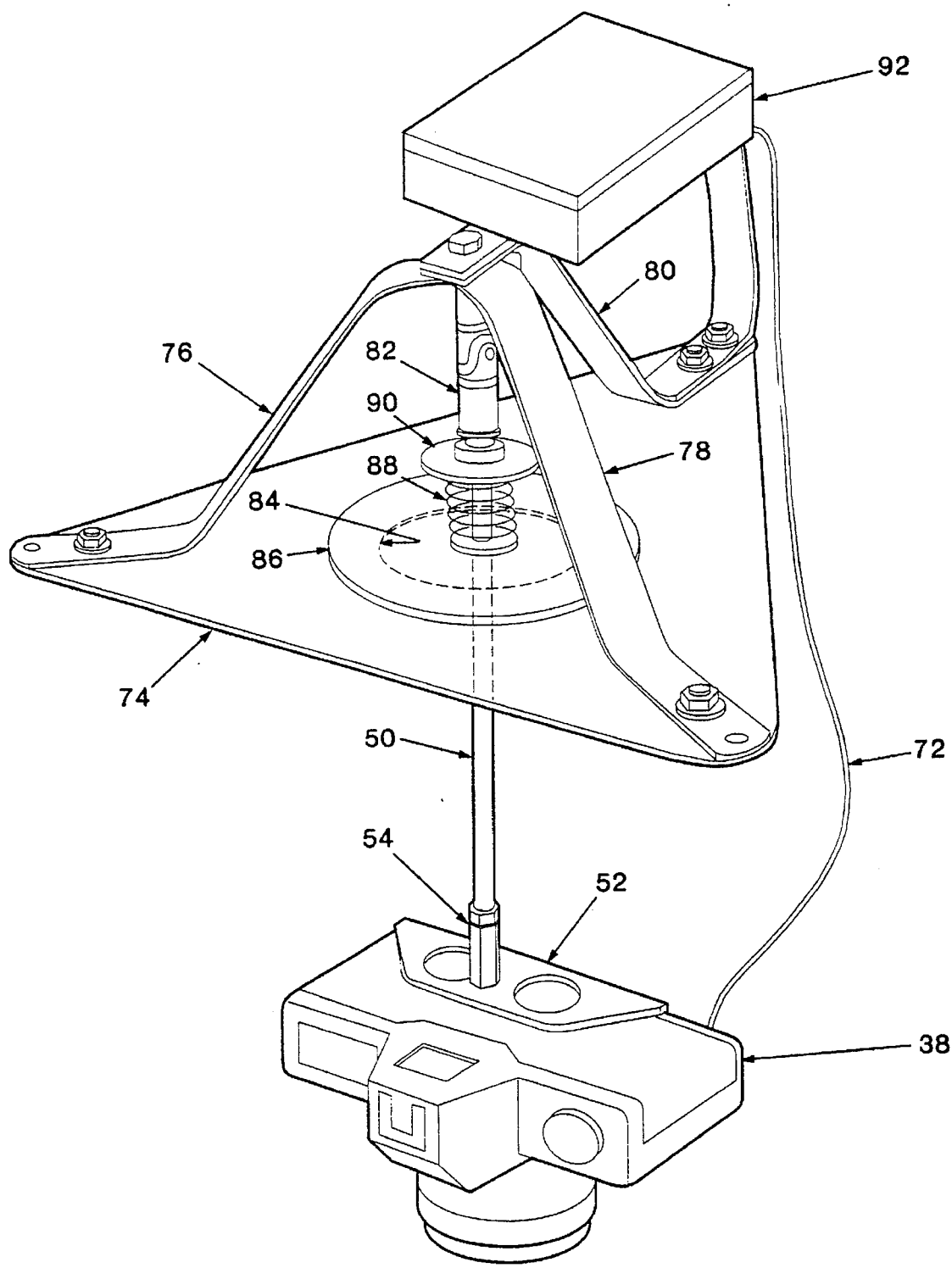
FIG. 6 is an enlarged perspective view of an alternative form of the apparatus according to the invention.

FIG. 6 illustrates an alternative form of the camera apparatus according to the invention, which is appropriately secured to the blimp 42 by a series of lines 46 (FIG. 2). In this form of the invention, those elements of the invention that remain the same carry the same reference numerals as the apparatus depicted in FIG. 4.

In this form of the invention, a triangular plate 74 is employed, secured beneath a bracket assembly comprising a series of braces 76, 78 and 80. The braces 76 through 80 join at a common point and the rod 50 is suspended therebeneath on a universal joint 82. The triangular plate 74 includes a large central aperture 84 and an even larger disk 86 bears on the plate 74 immediately adjacent the aperture 84. The disk 86, in turn, is biassed against the plate 74 by means of a spring 88 beating against a large washer 90 bearing against the universal joint 82. The disk 86, bearing on the plate 74, replaces the air dashpot 56 of the form of the invention depicted in FIG. 4. The friction between the disk 86 and the plate 74 dampens swinging movement of the camera 38 on the rod 50, when suspended beneath the blimp 32 (FIG. 2). As can be seen, the disk 86, bearing on the plate 74, dampens all horizontal movement of the camera 38 as opposed to the first form of the invention employing the air dashpot 56, which dampens only with one degree of freedom.

Similar to the version of the invention depicted in FIG. 4, the camera 38 is remotely activated by signals emanating from a receiver system 92. The receiver system 92 receives signals from the transmitter 42 (FIG. 2) for activation of the camera shutter.

The apparatus as illustrated and described is used to create a pictorial illustration of a site to be mapped, as shown in FIG. 3, through the following steps. First, the accident site 10 is marked with a series of marks 22 depicting visible indicia of scale on the accident site 10. Then, the blimp 32, with the camera 38 suspended there beneath, is elevated at a desired location above the accident site 10, the individual 36 controlling the positioning of the blimp 32 via the tether 34. The camera 38 is suspended at a level orientation with respect to earth above the accident site 10 by gravity, and any movement of the camera 38 is dampened by the air piston damper or the sliding disk.

Once the camera 38 is properly oriented over the site, the individual 40, via the transmitter 42, activates the shutter of the camera 38 to create a photographic image of the accident site 10. The blimp 32 is then lowered, and the film in the camera 38 is developed and enlarged to the extent desired.

Once the photographic image as illustrated in FIG. 1 has been created, it can be digitized in a conventional fashion so that computer graphics capabilities can be used to create the pictorial illustration as shown in FIG. 3. Once digitized, it can be adjusted for improved sharpness, color balance and orientation, and important features can also be highlighted. Alternatively, the photograph can be used directly as described further below.

Once the photographic image has been created, the photograph's scale 24 is determined, utilizing the marks 22 which are visible in the photographic image. Then, the accident is recreated by applying graphic art in the form of the vehicles 26, 28 and 30 at multiple positions in time. For example, the vehicle 26 is shown in three positions, first as it is traveling along the roadway 10, second as a skid begins as it encounters the vehicle 28, and third where impact occurs between the vehicles 26 and 30. Similarly, the vehicle 30 is illustrated traveling the roadway 12, and then at the point of impact with the vehicle 26. With the scale 24, and with the vehicles 26 through 30 being shown at their various positions in time, a precise and accurate recreation of an accident at the accident site 10 is possible, precisely depicting the accident for investigation, analysis and presentation to a trier of fact.

Various changes can be made to the invention without departing from the spirit thereof. For example, although the description above is with respect to an accident site, it will be apparent that the process and apparatus according to the invention can be used for overhead analysis of sites, overhead views of contamination, depictions of fires and damage patterns resulting, and overhead views of structural failures, such as in buildings and bridges. Various changes can be made without departing from the scope of the following claims.

What is claimed:

1. A method of creating a photographic map of a site to be mapped, comprising the steps of
   a. marking a selected portion of the site to be mapped with visible indicia of scale of that portion,
   b. suspending a camera in a stationary manner over the site,
   c. using the camera to create a vertically overhead photographic image of the site,
   d. scaling the portion of the photographic image utilizing the indicia, and
   e. creating a pictorial illustration by applying scaled symbols to the photographic image.

2. The method according to claim 1 including the further steps after step "c" of:
   c1. processing the photographic image,
   c2. digitizing the photographic image,
   c3. enhancing the image, and
   c4. highlighting features of the image.

3. The method according to claim 1, in which method step "b" includes the further steps of
   i. mounting the camera beneath a lighter-than-air blimp,
   ii. elevating the blimp at a desired location over the site, and
   iii. aligning the camera beneath the blimp prior to method step "c".

4. The method according to claim 3, in which the step of aligning includes adjusting the camera so that a long dimension of the photographic image is in a desired alignment with the site.

5. The method according to claim 1 including, after method step "c", the step of digitizing the photographic image before method step "d".

6. The method according to claim 1, in which method step "b" includes aligning the camera at a level orientation with respect to earth above the site.

7. The method according to claim 1, in which a vehicular accident site is recreated, and in which method step "e" includes the symbols comprising representations of each vehicle involved in the accident with each vehicle being represented at multiple positions in time.

8. A method of creating a photographic map of an accident site, comprising the steps of
   a. temporarily marking a selected portion of the site with visible indicia of scale of that portion,
   b. mounting a camera beneath a lighter-than-air blimp,
   c. suspending the blimp at a desired location over the site,
   d. aligning the camera and the blimp to be perpendicular to the site,
   e. using the camera to create a vertically overhead photographic image of the site,
   f. processing the photographic image,
   g. scaling the selected portion of the photographic image utilizing the indicia, and
   h. creating a pictorial illustration by applying representations of vehicles involved in the accident to the photographic image.

9. The method according to claim 8 including, after method step "f", the step of digitizing the photographic image.

10. The method according to claim 8 in which method step "g" includes adding representations of each vehicle at multiple positions in time.

* * * * *